(12) United States Patent
Adiba et al.

(10) Patent No.: US 7,203,712 B2
(45) Date of Patent: Apr. 10, 2007

(54) ALGORITHM TO FIND LOB VALUE IN A RELATIONAL TABLE AFTER KEY COLUMNS HAVE BEEN MODIFIED

(75) Inventors: Nicolas G. Adiba, San Jose, CA (US); Jaime F. Anaya, San Jose, CA (US); Bruce G. Lindsay, San Jose, CA (US); Guido Rost, Cupertino, CA (US); Budi Surjanto, Markham (CA)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 10/789,625

(22) Filed: Feb. 26, 2004

(65) Prior Publication Data
US 2005/0193040 A1    Sep. 1, 2005

(51) Int. Cl.
*G06F 17/30* (2006.01)
*G06F 12/00* (2006.01)

(52) U.S. Cl. ...................... 707/204; 707/202
(58) Field of Classification Search ............... 707/1–4, 707/7–10, 100–104.1, 200–204; 709/200–203, 709/205, 212; 711/211–214
See application file for complete search history.

(56) References Cited

U.S. PATENT DOCUMENTS

| | | | | |
|---|---|---|---|---|
| 5,890,154 A * | 3/1999 | Hsiao et al. | ............... | 707/8 |
| 5,920,860 A | 7/1999 | Maheshwari et al. | ......... | 707/5 |
| 6,061,689 A | 5/2000 | Chang et al. | ........... | 707/103 R |
| 6,067,541 A * | 5/2000 | Raju et al. | .................... | 707/3 |
| 6,073,140 A * | 6/2000 | Morgan et al. | ............. | 707/203 |
| 6,105,017 A | 8/2000 | Kleewein et al. | .............. | 707/2 |
| 6,144,966 A * | 11/2000 | Roberts | .................... | 707/101 |
| 6,209,000 B1 | 3/2001 | Klein et al. | ................ | 707/203 |
| 6,466,950 B1 * | 10/2002 | Ono | .......................... | 707/201 |
| 6,490,595 B1 * | 12/2002 | Candee et al. | ............. | 707/202 |
| 6,738,082 B1 | 5/2004 | Dong et al. | ................ | 345/769 |
| 6,889,231 B1 * | 5/2005 | Souder et al. | ........... | 707/104.1 |
| 6,993,539 B2 * | 1/2006 | Federwisch et al. | ........ | 707/201 |

(Continued)

OTHER PUBLICATIONS

Doug Stacey, Replication: DB2, Oracle, or Sybase?, Dec. 1995, ACM Sigmod record, vol. 24, issue 4, pp. 95-101.*

(Continued)

*Primary Examiner*—Jeffrey Gafrin
*Assistant Examiner*—Jacques Veillard
(74) *Attorney, Agent, or Firm*—Sawyer Law Group LLP (57) ABSTRACT

A method and system for asynchronously replicating data changes in a database system captures update information for a data update in a source table from a database log, where the data value from the data update is not in the database log. A query is built to obtain the data value from the source table using the update information, including a key column value that identifies the row of the source table in which the data resides. When the key column is also updated in the same or different transaction, the data update information is stored, and the updated key column value is replaced with a later captured key column update value. The query is built and executed, and the data update is replicated at a target table. In this manner, data objects whose values are not recorded in a database log can be asynchronously replicated in a database system.

25 Claims, 4 Drawing Sheets

U.S. PATENT DOCUMENTS 7,031,974 B1 * 4/2006 Subramaniam ............. 707/102
7,076,481 B2 * 7/2006 Osborne et al. ............... 707/3
7,076,508 B2 * 7/2006 Bourbonnais et al. ...... 707/202

OTHER PUBLICATIONS

Calton Pu et al., Replica Control in Distributed System: An Asynchronous Approach, Apr. 1991, ACM Press, vol. 20, issue 2, pp. 377-386.*

Rober haskin et al., Recovery management in QuickSilver, Feb. 1988, ACM Press, vol. 6, issue 1, pp. 82-108.*

Lei Gao et al., Application Specific Data Replication for Edge Services, May 2003, ACM Press, pp. 449-460.*

Carino, F. et al., "StorHouse Metanoia—New Applications for Database, Storage & Data Warehousing," 2001, 521-531.

Hartisa, J. et al., "Value-Based Scheduling in Real Time Database Systems," 1993, 117-126.

Bernstein, P. et al., "Context-Based Prefetch—an Optimization for Implementing Objects on Relations," 2000, 177-189.

Connell, W. et al., "Optimizer and Parallel Engine Extensions for Handling Expensive Methods Based on Large Objects," 1999, 304-313.

Jennings, R., "*SQL Server 2000 Gains on Oracle*," Visual Basic Progammer's Journal, vol. 10, 2000, pp. 20-29.

* cited by examiner

ALGORITHM TO FIND LOB VALUE IN A RELATIONAL TABLE AFTER KEY COLUMNS HAVE BEEN MODIFIED

FIELD OF THE INVENTION

The present invention relates to databases, and more particularly to the asynchronous replication of objects not logged in relational databases.

BACKGROUND OF THE INVENTION

Data replication in relational or hierarchical databases is increasingly important as databases are deployed more and more in distributed environments. The goal of data replication is to maintain one or more copies of a source object in the database across servers, possibly on different platforms and geographical locations. One method of data replication is log-based asynchronous replication. A database log records all changes to the tables in the database. Changes are captured from the database log outside of a commit scope of the original database transaction.

Figure 1:
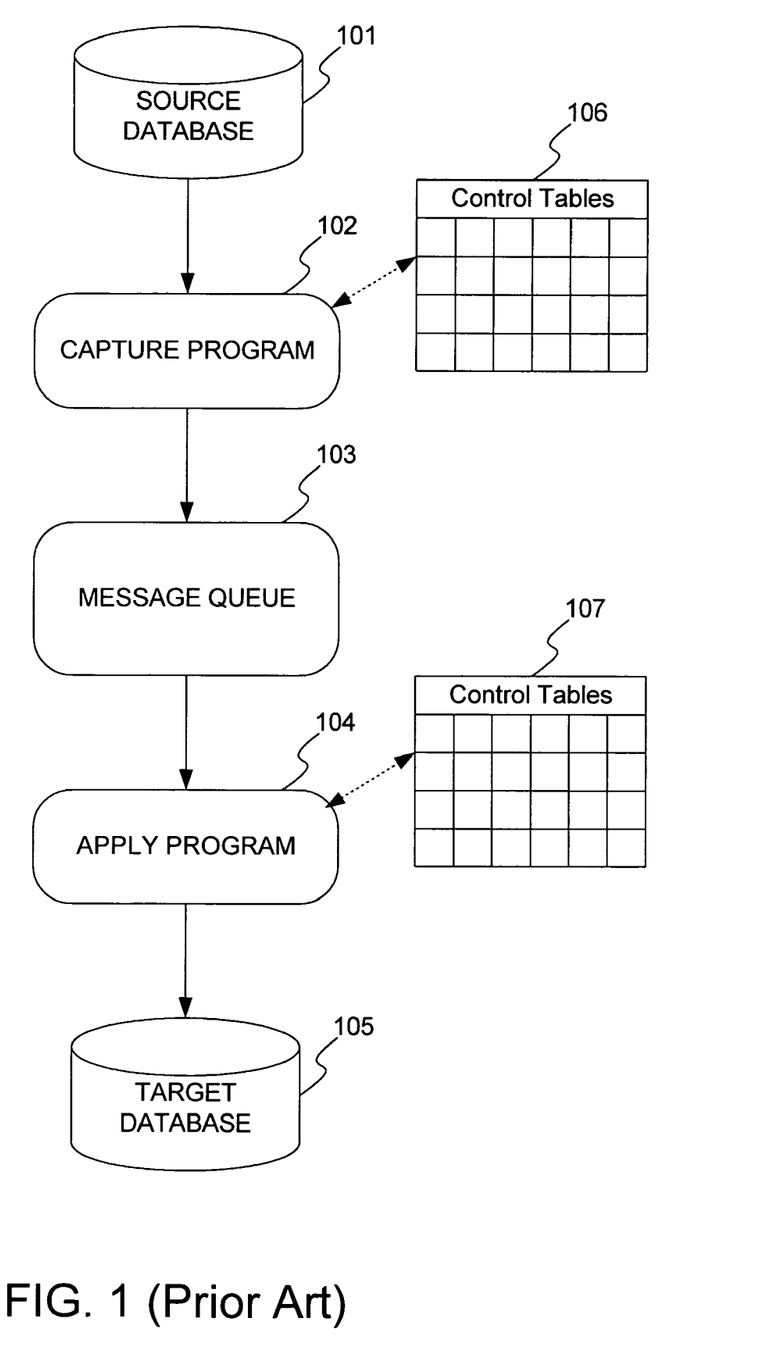
FIG. 1 illustrates components of a conventional asynchronous replication process.

FIG. 1 illustrates components of a conventional asynchronous replication process. At each node in the database system is a capture program 102 and an apply program 104. The capture program 102 and the apply program 104 each maintain control tables 106 and 107 at the node. At the node where changes are made is the source database 101 containing a source table (not shown). At the node where the changes are to be replicated is the target database 105 containing the target table (not shown). A message queue 103 is the mechanism used for transporting messages between the source database 101 and the target database 105.

During the replication process, the capture program 102 reads the database log for committed changes to the source database 101. The database log contains the source table and row that was changed, the type of operation, the column data type information, the data value after the change for insert and update operations, and the data value before the change for delete and update operations. These changes are then formatted into messages and sent to the message queue 103 to the target database 105. Upon delivery to the message queue 103, the apply program 104 retrieves the messages and applies the changes to the target database 105.

However, when a change involves large data objects (LOB), some databases provide the option not to record the after or before value of the LOB in the database log. Without the ability to obtain the after or before value of the LOB from the database log, the replication process cannot successfully replicate the change at the target database 105.

Accordingly, there exists a need for a method and system for asynchronously replicating data changes in a database system when the changed data is not available in a database log. The present invention addresses such a need.

SUMMARY OF THE INVENTION

A method and system for asynchronously replicating data changes in a database system captures update information for a data update in a source table from a database log, where the data value from the data update is not in the database log. A query is built to obtain the data value from the source table using the update information, including a key column value that identifies the row of the source table in which the data resides. When the key column is also updated in the same or different transaction, the data update information is stored, and the updated key column value is replaced with a later captured key column update value. The query is built and executed, and the data update is replicated at a target table. In this manner, data objects whose values are not recorded in a database log can be asynchronously replicated in a database system.

DETAILED DESCRIPTION

The present invention provides a method and system for asynchronously replicating data changes in a database system when the changed data is not available in a database log. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 2:
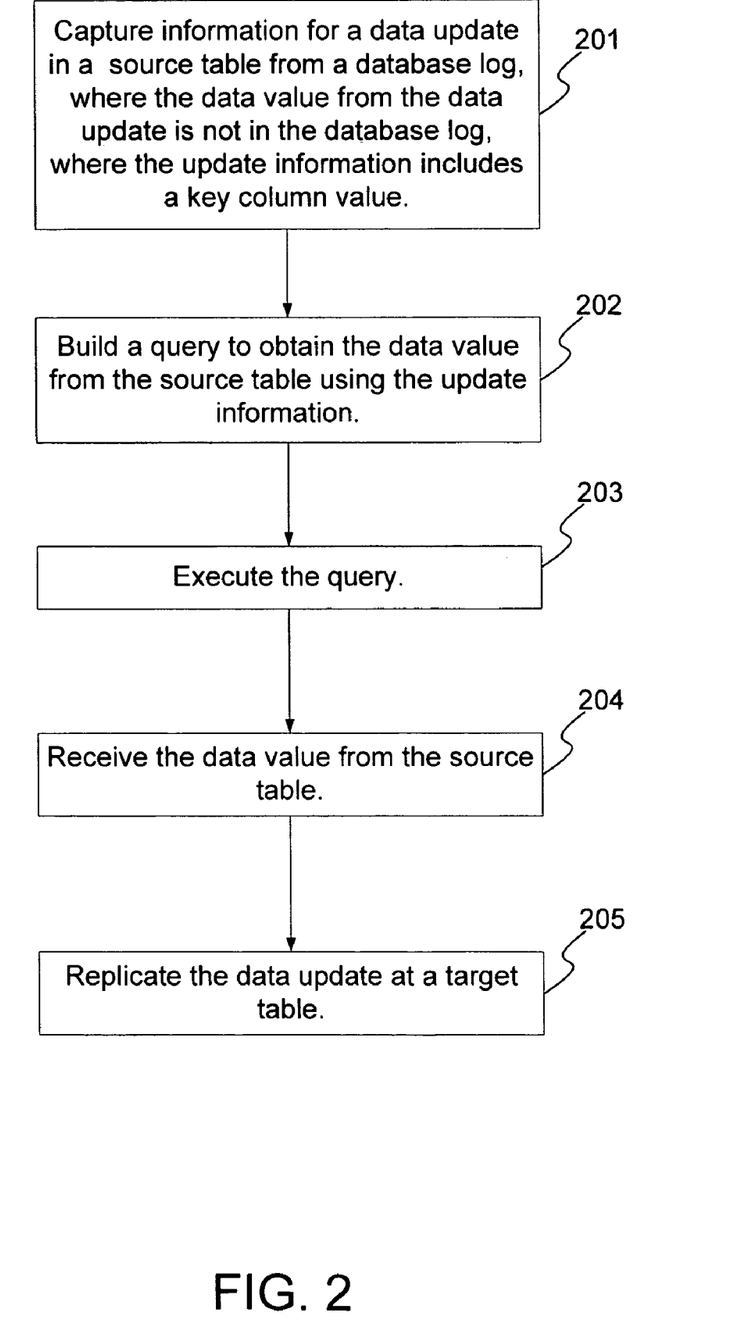
FIG. 2 is a flowchart illustrating a preferred embodiment of a method for asynchronously replicating data changes in a database system when the changed data is not available in a database log in accordance with the present invention.

FIG. 2 is a flowchart illustrating a preferred embodiment of a method for asynchronously replicating data changes in a database system when the changed data is not available in a database log in accordance with the present invention. First, a capture program at the source database captures the update or change information for a data update in a source table from a database log, where the data value from the data update is not in the database log, via step 201. In the preferred embodiment, the data is a large object (LOB) but can be other data types whose values are not logged. The database log also includes a key column value. The key column value uniquely identifies the row in which the data resides. In the preferred embodiment, the update information further includes the type of operation and column data type information. Other or different information may also be used.

After the capture program captures the commit for the transaction, a query is built to obtain the data value from the source table using the update information, via step 202. The data value can be found in the source table by generating a database query using the update information, particularly the key column value. In order for the query to identify the row in which the data resides, at least one unique key column has been created on the source table. The query finds the row with the matching key column value and obtains the data value from that row of the source table.

Then, the query is executed, via step 203, and the data value is returned. The data value, along with other update information, is then formatted into a message and sent to the message queue. The apply program at the target database then retrieves the message and replicates the change at the target table, via step 204.

For example, assume that a source table, T1, contains the following columns: id, name, age, resume, and picture. In this example, "id" is the key column, and "resume" and "picture" are LOB columns. Assume also that the following transaction containing one row operation is performed:

insert (T1: id(10), name ('john'), age (17), resume (johnResume), picture (johnPic))

Here, in the source table, T1, in the row with key column value=10, the values of the "name" and "age" columns are updated to 'john' and '17', respectively. The LOB columns, "resume" and "picture", are also updated with the values in the objects, 'johnResume' and 'johnPic', respectively. The LOB values in the "resume" and "pictures" columns are not recorded in the database log.

During data replication, the capture program at the source database examines the database log. When the capture program reaches the log entry for the above transaction, the update information for the transaction are captured from the database log, via step 201, including the source table name (T1), the key column value (10), and the fact that LOB columns, "resume" and "picture", were updated. However, the actual values for the LOBs were not recorded in the database log.

Thus, a query is built to obtain the LOB values from the source table "T1", via step 202. In this example, the built query is as follows:

SELECT resume from T1 where T1.id=10;
SELECT picture from T1 where T1.id.=10;

This query is then executed, via step 203, and the LOB values for the "resume" and "picture" columns are returned, via step 204. These LOB values, along with other information concerning the changes effectuated by the transaction, are then formatted into in a message and sent to a message queue. The apply program at the target database retrieves the message and replicates the changes at the target table, via step 205.

In addition to replicating data changes in a transaction-with a single row operation, the present invention also applies to transactions that update the key column and the data column in the same transaction. This can occur in two ways: the data column and the key column are updated in the same row operation; or the data column and the key column are updated in different rows operations.

The proper key column value must be used in the query in order to obtain the correct data values from the source table. If the transaction updates the key column update and the data column in the same row operation, then the key column value after the update will be used. If the transaction updates the data column in one row operation and updates the key column in a different row operation, then the key column value after the latest row operation will be used.

Figure 3:
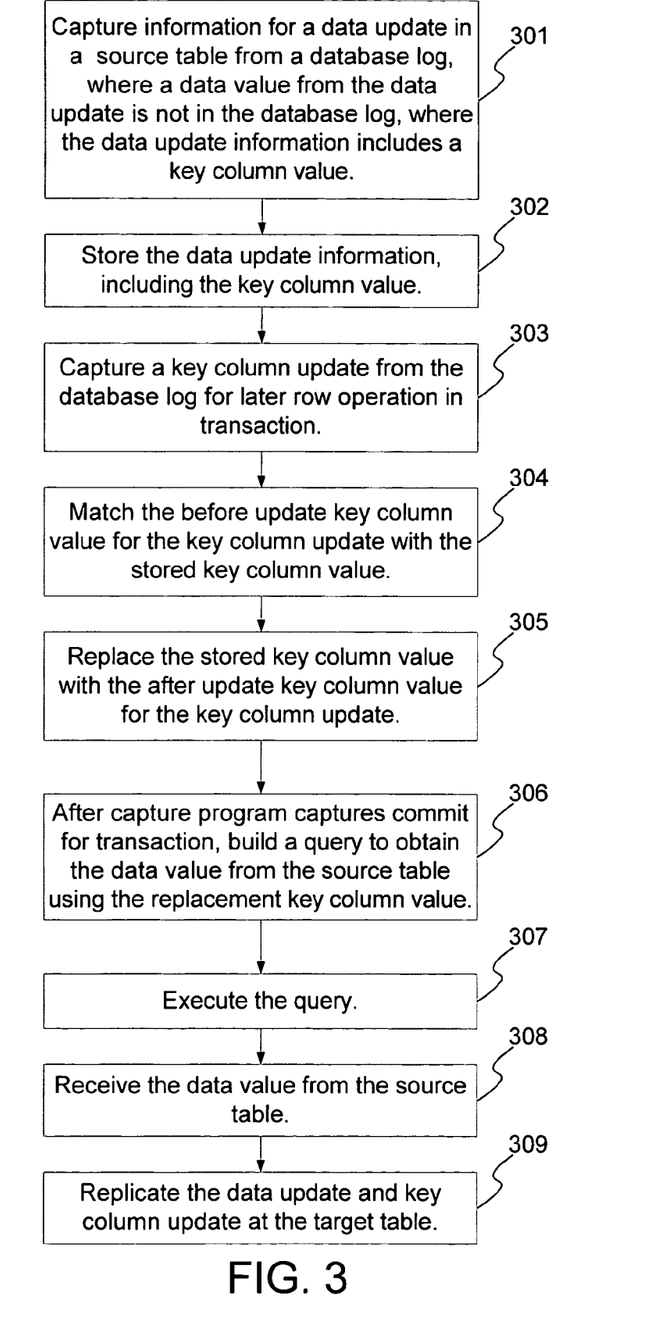
FIG. 3 is a flowchart illustrating the method for asynchronously replicating data changes in a database system when the changed data is not available in a database log in accordance with the present invention, when the key column and the data column are changed in the same transaction.
Figure 4:
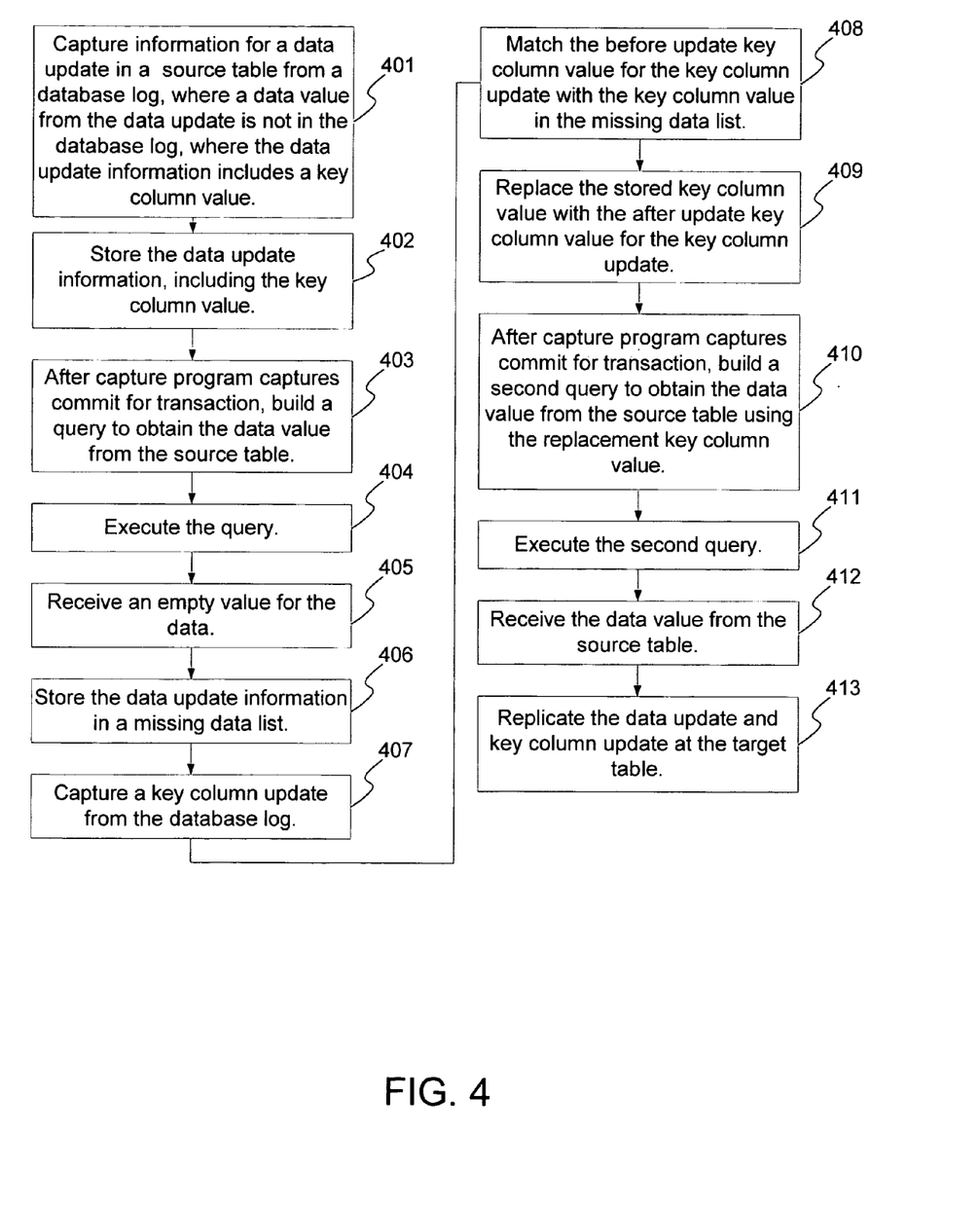
FIG. 4 is a flowchart illustrating the method for asynchronously replicating data changes in a database system when the changed data is not available in a database log in accordance with the present invention, when the key column and the data column are changed in different transactions.

FIG. 3 is a flowchart illustrating the method for asynchronously replicating data changes in a database system when the changed data is not available in a database log in accordance with the present invention, when the key column and the data column are changed in the same transaction. First, the capture program captures data update information for a data update in the source table from the database log, via step 301, where the data value from the data update is not in the database log. The data update information includes the current key column value associated with the data. Since a key column can also be updated in a row operation not yet examined, the capture program first stores the data update and its currently associated key column value. For the later row operations in the transaction, the capture program captures a key column update from the database log, via step 303. The before and after update key column values from the key column update are recorded in the database log. The capture program then matches the before update key column value with the stored key column value, via step 304. The stored key column value is then replaced with the after update key column value, via step 305. After the capture program captures the commit for the transaction, a query is built to obtain the data value from the source table using the replacement key column value, via step 307. Thus, the key column value after the key column update in the transaction is used in the query. The query is executed, via step 307, and the data value from the source table is returned, via step 308. The data value, along with other update information, is formatted into a message and sent to a message queue. An apply program at the target database then retrieves the message and replicates the key column and data updates at the target table, via step 309.

For example, assume that a transaction involved the following three row operations was performed:

update (T1, id(10): resume (johnResume - > johnResum1))
update (T1, id(5): id (5 - > 7), picture (jaimePic1 - > jaimePic2))
update (T1, id(10): id (10 - > 11))

The first row operation updates the "resume" column, a LOB column, in the row with key column value=10 in the source table, T1. The second row operation updates the "picture" column, another LOB column, in the row with key column value=5, and also updates the key column value from 5 to 7. The third row operation updates the key column value of 10 to 11. Thus, in the second row operation, both the LOB column and the key column are updated in the same row operation. In the first and third row operations, the LOB column and the key column are updated in different row operations. Neither the LOB values for the "resume" or "picture" columns are recorded in the database log.

During the replication process in accordance with the present invention, the capture program at the source database examines the database log. From the database log, it captures data update information, including the key column value=10, for the update of the "resume" column from the first row operation, via step 301. However, the LOB value for the "resume" column was not recorded in the database log. The capture program then stores the update information for the "resume" column, including its current key column value, 10, via step 302. Next, the capture program captures the changes to the key column, "id", and the LOB column, "picture" from the second row operation, via step 301, and stores this information, via step 302. Next, the capture program captures the key column value update in the third row operation, via step 303, from the database log. The capture program matches the before update key column value, "10", with the stored key column value from the first row operation, via step 304. The stored key column value is then replaced with the after update key column value, "11", from the third row operation, via step 305. A query is then built to obtain the LOB value for the "resume" column, using the after update key column value, "11, via step 306, and to obtain the LOB value for the "picture" column, using the after update key column value, "7", from the second row operation. In this example, the following query is built:

```
SELECT resume from T1 where T1.id = 11;
SELECT picture form T1 where T1.id = 7;
```

The query is executed, via step 307, and the 'johnResum1' and the 'jaimePic2' values for the "resume" and "picture" columns, respectively, are returned. These LOB values, along with other update information, are formatted into a message and sent to the message queue. The apply program at the target database retrieves the message and replicates the LOB column and key column updates at the target table, via step 309.

The present invention also applies to updates to key columns and data columns in the different transactions. FIG. 4 is a flowchart illustrating the method for asynchronously replicating data changes in a database system when the changed data is not available in a database log in accordance with the present invention, when the key column and the data column are changed in different transactions. First, the capture program captures data update information for the data update in the source table from the database log, via step 401, where the data value from the data update is not in the database log. The data update information includes the current key column value associated with the data. Since a key column can also be updated in row operations not yet examined, the capture program first stores the data update and its currently associated key column value, via step 402. After the capture program captures the commit for the transaction, the capture program builds a query to obtain the data value from the source table using the key column value, via step 403. However, when changes to the key column was performed in a later transaction, the updated key column value has not yet been captured by the capture program at the time the query is built. Thus, when the query is executed, via step 404, an empty value for the data is returned, via step 405. The capture device then stores information for the data in a missing data list, via step 406.

Later, the capture program captures a key column update from the database log, via step 407, for a different transaction. The before and after update key column values for the key column update are recorded in the database log. The capture program then matches the before update key column value with the key column value stored in the missing data list, via step 408. The stored key column value is then replaced with the after update key column value, via step 409. After the capture program captures the commit for the subsequent transaction, a second query is built to obtain the data value from the source table using the after update key column value, via step 410. Thus, the key column value after the latest examined transaction is used in the query. The second query is executed, via step 411, and the data value from the source table is returned, via step 412. The data value, along with other update information, is formatted into a message and sent to a message queue. An apply program at the target database then retrieves the message and replicates the key column and data updates at the target table, via step 413. Note that the process needs to repeat if the data value is again not found because of a still later transaction that has again updated the key.

For example, assume that the following transactions were performed:
Transaction 1:
update (T1, id(10): resume (johnResume->johnResum1))
Transaction 2:
update (T1, id(10): id (10->11))

The row operation in the first transaction updates the "resume" column, a LOB column, in the row with key column value=10 in the source table, T1. The row operation in the second transaction updates the key column value of 10 to 11.

During the replication process in accordance with the present invention, the capture program at the source database examines the database log. From the database log, it captures update information, including the key column value=10, for the update of the "resume" column in the first transaction, via step 401. However, the LOB value for the "resume" column was not recorded in the database log. The capture program then stores the update information, including the current key column value, "10", via step 402. A query is then built to obtain the data value from the source table using the key column value=10, via step 403. In this example, the following query is built:

SELECT resume from T1 where T1.id=10

This query is executed, via step 404. However, since the key column value has been changed by the second transaction, but the capture program has yet to examine changes performed by that transaction, the value for the "resume" column cannot be found in the row with key column value=10. In this case, an empty value for the data is returned, via step 405. When the capture program receives the empty value, it stores the data update information in a missing item list, via step 406.

Later, the capture program captures the key column value update from the second transaction, via step 407, from the database log. The capture program matches the before update key column value, "10, with the stored key column value in the missing item list, via step 408. The stored key column value, "10, is then replaced with the after update key column value, "11", via step 409. A second query is then built to obtain the LOB value for the "resume" column, using the key column value=11, via step 410. In this example, the second query is as follows:

SELECT resume from T1 where T1.id=11

This second query is executed, via step 411. Since the "resume" column value can now be found, the 'johnResum1' value for the "resume" column is returned, via step 412. The LOB values, along with other update information, are formatted into a message and sent to the message queue. The apply program at the target database retrieves the message and replicates the "resume" column and key column updates at the target table, via step 413.

In the preferred embodiment, the missing data list is maintained in persistent storage. For the situation where the system at the source table is restarted between transactions that update key columns, i.e., between steps 406 and 407, the data for which an empty value were returned is not lost. Thus, when the system resumes operation, and the key column value updates are subsequently captured by the capture program, it can be properly matched to the proper data in the missing data list.

A method and system for asynchronously replicating data changes in a database when the changed data is not available in a database log has been disclosed. The method captures update information for a data update in a source table from a database log, where the data value from the data update is not in the database log. The update information includes a key column value, which identifies the row of the source table in which the data resides. A query is then built to obtain the data value from the source table using the update information.

When the key column is also updated in the same transaction, the method stores the data update information, and replaces the data's associated key column value with the updated value, according to a later captured key column update. The query is then built and executed, and the data update and key update can be replicated at a target table.

When the key column update is performed in a subsequent and different transaction from the data update, the method builds a first query with the data's current key column value. When an empty value for the data is returned, the data update information is stored in a missing data list. When the key column update is later captured, the method replaces the data's key column value in the missing data list with the updated key column value, and builds a second query with the updated key column value. The second query is then built and executed. In this manner, data objects whose values are not recorded in a database log can be asynchronously replicated in a peer to peer database system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for asynchronously replicating data changes in a database system, the method comprising:
    capturing, from a database log associated with the database system, information corresponding to an update of a data value of an object in a source table associated with the database system, the database log not including the data value of the object, the information corresponding to the update of the data value of the object comprising a key column value that identifies a row in the source table in which the object resides;
    building a query to obtain the data value of the object from the source table, the query including the key column value that identifies the row in the source table in which the object resides;
    executing the query;
    receiving the data value of the object from the source table in response to the query; and
    replicating the update of the data value of the object with the received data value at a target table associated with the database system.

2. The method of claim 1, wherein the object is a large object (LOB).

3. The method of claim 1, wherein capturing information corresponding to an update of a data value of an object further comprises:
    storing the information corresponding to the update of the data value of the object including the key column value that identifies the row in the source table in which the object resides.

4. The method of claim 3, wherein capturing information corresponding to an update of a data value of an object further comprises:
    capturing a key column update from the database log;
    matching a before update key column value associated with the key column update with the stored key column value; and
    replacing the stored key column value with an after update key column value associated with the key column update.

5. The method of claim 4, wherein building a query to obtain the data value of the object from the source table comprises:
    building the query to obtain the data value of the object from the source table using the after update key column value.

6. The method of claim 4, wherein the before update key column value and the after update key column value are recorded in the database log.

7. The method of claim 4, wherein the update of the data value of the object and the key column update were previously performed in a same transaction.

8. The method of claim 3, wherein responsive to receiving an empty value for the data value of the object from the source table in response to the query, the method further includes:
    storing the information corresponding to the update of the data value of the object in a missing data list, the information corresponding to the update of the data value of the object including the key column value that identifies the row in the source table in which the object resides;
    capturing a key column update from the database log;
    matching a before update key column value associated with the key column update with the key column value stored in the missing data list; and
    replacing the key column value stored in the missing data list with an after update key column value associated with the key column update; and
    building a second query to obtain the data value of the object from the source table using the after update key column value.

9. The method of claim 8, further comprising:
    executing the second query; and
    receiving the data value of the object from the source table in response to the second query,
    wherein replicating the update comprises replicating the key column update and the update of the data value of the object with the received data value at the target table associated with the database system.

10. The method of claim 8, wherein the update of the data value of the object and the key column update were previously performed in separate transactions.

11. A computer readable medium with program instructions, tangibly stored thereon, for asynchronously replicating data changes in a database system, the program instructions comprising instructions for:
    capturing, from a database log associated with the database system, information corresponding to an update of a data value of an object in a source table associated with the database system, the database log not including the data value of the object, the information corresponding to the update of the data value of the object comprising a key column value that identifies a row in the source table in which the object resides; and
    building a query to obtain the data value of the object from the source table, the query including the key column value that identifies the row in the source table in which the object resides;
    executing the query;

receiving the data value of the object from the source table in response to the query; and replicating the update of the data value of the object with the received data value at a target table associated with the database system.

12. The computer readable medium of claim 11, wherein the object is a large object (LOB).

13. The computer readable medium of claim 11, wherein the instructions for capturing information corresponding to an update of a data value of an object further comprises instructions for:

storing the information corresponding to the update of the data value of the object including the key column value that identifies the row in the source table in which the object resides.

14. The computer readable medium of claim 13, wherein responsive to receiving an empty value for the data value of the object from the source table in response to the query, the computer readable medium further comprises instructions for:

storing the information corresponding to the update of the data value of the object in a missing data list, the information corresponding to the update of the data value of the object including the key column value that identifies the row in the source table in which the object resides;

capturing a key column update from the database log;

matching a before update key column value associated with the key column update with the key column value stored in the missing data list; and replacing the key column value stored in the missing data list with an after update key column value associated with the key column update; and building a second query to obtain the data value of the object from the source table using the after update key column value.

15. The computer readable medium of claim 14, further comprising instructions for:

executing the second query;

receiving the data value of the object from the source table in response to the second query; and wherein the instructions for replicating the update comprises instructions for replicating the key column update and the update of the data value of the object with the received data value at the target table associated with the database system.

16. The computer readable medium of claim 14, wherein the update of the data value of the object and the key column update were previously performed in separate transactions.

17. The computer readable medium of claim 11, wherein the instructions for capturing information corresponding to an update of a data value of an object further comprises instructions for:

capturing a key column update from the database log;

matching a before update key column value associated with the key column update with the stored key column value; and replacing the stored key column value with an after update key column value associated with the key column update.

18. The computer readable medium of claim 17, wherein the instructions for building a query to obtain the data value of the object from the source table comprises instructions for:

building the query to obtain the data value of the object from the source table using the after update key column value.

19. The computer readable medium of claim 17, wherein the before update key column value and the after update key column value are recorded in the database log.

20. The computer readable medium of claim 17, wherein the update of the data value of the object and the key column update were previously performed in a same transaction.

21. A system comprising:

a source database comprising a source table;

a database log associated with the source database, the database log comprising information corresponding to an update of a data value of an object in the source table, the database log not including the data value of the object, the information corresponding to the update of the data value of the object comprising a key column value that identifies a row in the source table in which the object resides; and a mechanism for, building a query to obtain the data value of the object from the source table, the query including the key column value that identifies the row in the source table in which the object resides;

executing the query;

receiving the data value of the object from the source table in response to the query; and replicating the update of the data value of the object with the received data value at a target table associated with a target database.

22. The system of claim 21, wherein the object is a large object (LOB).

23. The system of claim 21, further comprising:

a memory associated with the source database, wherein the information corresponding to the update of the data value of the object including the key column value that identifies the row in the source table in which the object resides is stored in the memory.

24. The system of claim 23, wherein:

the database log further comprises information corresponding to a key column update, the information corresponding to the key column update comprising a before update key column value and an after update key column value, wherein the mechanism is operable to match the before update key column value with the key column value stored in the memory and replace the key column value stored in the memory with the after update key column value.

25. The system of claim 24, wherein the query is built to obtain the data value from the source table using the after update key column value.

* * * * *